(12) United States Patent
Husband et al.

(10) Patent No.: US 10,533,575 B2
(45) Date of Patent: Jan. 14, 2020

(54) FAN BLADE TIP WITH FRANGIBLE STRIP

(71) Applicant: United Technologies Corporation, Farmington, CT (US)

(72) Inventors: Jason Husband, South Glastonbury, CT (US); James Glaspey, Farmington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 205 days.

(21) Appl. No.: 15/696,978

(22) Filed: Sep. 6, 2017

(65) Prior Publication Data

US 2019/0072106 A1 Mar. 7, 2019

(51) Int. Cl.
| | | |
|---|---|---|
| *F01D 11/12* | (2006.01) | |
| *F04D 29/38* | (2006.01) | |
| *F04D 29/52* | (2006.01) | |
| *F02C 3/04* | (2006.01) | |

(52) U.S. Cl.
CPC ......... *F04D 29/388* (2013.01); *F04D 29/526* (2013.01); *F02C 3/04* (2013.01); *F05D 2220/323* (2013.01); *F05D 2220/36* (2013.01); *F05D 2240/14* (2013.01); *F05D 2240/307* (2013.01); *F05D 2250/283* (2013.01)

(58) Field of Classification Search
CPC ........ F01D 5/20; F01D 11/122; F01D 11/127; F04D 29/388; F05D 2250/283
See application file for complete search history.

(56) References Cited

U.S. PATENT DOCUMENTS

| 7,114,912 B2 | 10/2006 | Gerez et al. |
| 8,840,361 B2* | 9/2014 | Bottome ................. F01D 5/14 |
| | | 415/119 |
| 8,845,283 B2* | 9/2014 | Cairo .................... F04D 29/023 |
| | | 415/173.3 |
| 9,670,786 B2* | 6/2017 | Read ........................ F01D 5/20 |
| 2013/0195633 A1 | 8/2013 | Hildebrand et al. |
| 2013/0280049 A1 | 10/2013 | Fisk et al. |
| 2018/0163743 A1* | 6/2018 | Turner .................... F01D 5/147 |

FOREIGN PATENT DOCUMENTS

| EP | 2112330 A2 | 10/2009 |
| EP | 2428645 A2 | 3/2012 |
| EP | 2607628 A2 | 6/2013 |
| EP | 2913482 A1 | 9/2015 |
| WO | 2014096839 A1 | 6/2014 |
| WO | 2015015207 A1 | 2/2015 |

OTHER PUBLICATIONS

European Search Report for Application No. 18193058.1-1006; dated Jan. 29, 2019; 8 pgs.

* cited by examiner

*Primary Examiner* — Ninh H Nguyen
(74) *Attorney, Agent, or Firm* — Cantor Colburn LLP

(57) ABSTRACT

Disclosed is a fan blade for a gas turbine engine, the fan blade having: an airfoil having a leading edge, a trailing edge, a tip, and a frangible strip connected to the blade tip and extending outwardly therefrom, the frangible strip being less resistant to plastic deformation than the fan blade tip.

14 Claims, 5 Drawing Sheets

FAN BLADE TIP WITH FRANGIBLE STRIP

BACKGROUND

Exemplary embodiments of the present disclosure pertain to the art of rotary blade design and more specifically to a fan blade for a gas turbine engine having a frangible strip on a fan blade tip.

Engine manufactures may be concerned with maintaining tight clearances between fan blade tips and abradable rub strips in fan cases to achieve improved aerodynamic efficiency. Fan blade excitations in a fan module of a gas turbine engine are known and may result from various kinds of perturbing events, e.g., inflight encounters with birds, the decoupling of fan blades due to structural failures, and other known and observed causes. During a perturbing event a fan rotor centerline may shift away from the engine centerline due to induced vibratory motion and/or unbalanced impulses extending radially outward from the fan blade root towards the blade tip. As the rotor centerline shifts away from the engine centerline fan blades may be urged towards the fan case and fan blade tips may move towards abradable rub strips that line the inner surface of the fan case. As the fan blade tips and rub strips interact, the fan rotor may decelerate and generate large torques which are then reacted by the fan case and disbursed among the various engine static structures. There is a need to reduce the effect of the interaction between fan blade tips and rub strips when the rotor centerline shifts away from the engine centerline.

BRIEF DESCRIPTION

Disclosed is a fan blade for a gas turbine engine, the fan blade comprising: an airfoil having a leading edge, a trailing edge, a tip, and a frangible strip connected to the blade tip and extending outwardly therefrom, the frangible strip being less resistant to plastic deformation than the fan blade tip.

In addition to one or more of the features described above, or as an alternative, further embodiments may include that the fan blade tip and the frangible strip are connected by a concave mating portion in one of the fan blade tip and the frangible strip and a convex mating portion in another of the fan blade tip and the frangible strip.

In addition to one or more of the features described above, or as an alternative, further embodiments may include that an abradable portion of the frangible strip extends over a pressure side edge and a suction side edge of the fan blade tip and the frangible strip extends in a fan blade chord direction over the fan blade tip.

In addition to one or more of the features described above, or as an alternative, further embodiments may include that one or more dowels fix the frangible strip to the fan blade tip.

In addition to one or more of the features described above, or as an alternative, further embodiments may include that the frangible strip is anisotropic and the abradable portion is less resistant to plastic deformation than the mating portion.

In addition to one or more of the features described above, or as an alternative, further embodiments may include that the frangible strip includes a plurality of honeycomb segments that comprise internal stiffening tubes extending and tapering in one or both of a fan blade span direction and the fan blade chord direction.

Further disclosed is a gas turbine engine comprising a fan module including a fan case, a fan rotor, a plurality of fan blades connected to the fan rotor, each fan blade comprising one or more features disclosed hereinabove.

In addition to one or more of the features described above, or as an alternative, further embodiments may include a first gap between the fan blade tip and the fan case and a second gap between the frangible strip and the fan case, the second gap being smaller than the first gap.

In addition to one or more of the features described above, or as an alternative, further embodiments may include that the fan case includes an abradable rub strip facing the fan blade tip.

In addition to one or more of the features described above, or as an alternative, further embodiments may include that the frangible strip is less resistant to plastic deformation than the rub strip.

Further disclosed is a method of minimizing torque transfer to a fan case from a blade of a fan in a gas turbine engine, comprising contacting a surface of a fan case with a frangible strip located at a tip of an airfoil of the fan blade.

In addition to one or more of the features described above, or as an alternative, further embodiments may include absorbing at least a portion of torque transferable between the fan blade and the fan case in the frangible strip.

In addition to one or more of the features described above, or as an alternative, further embodiments may include plastically deforming the frangible strip to dissipate absorbed torque.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
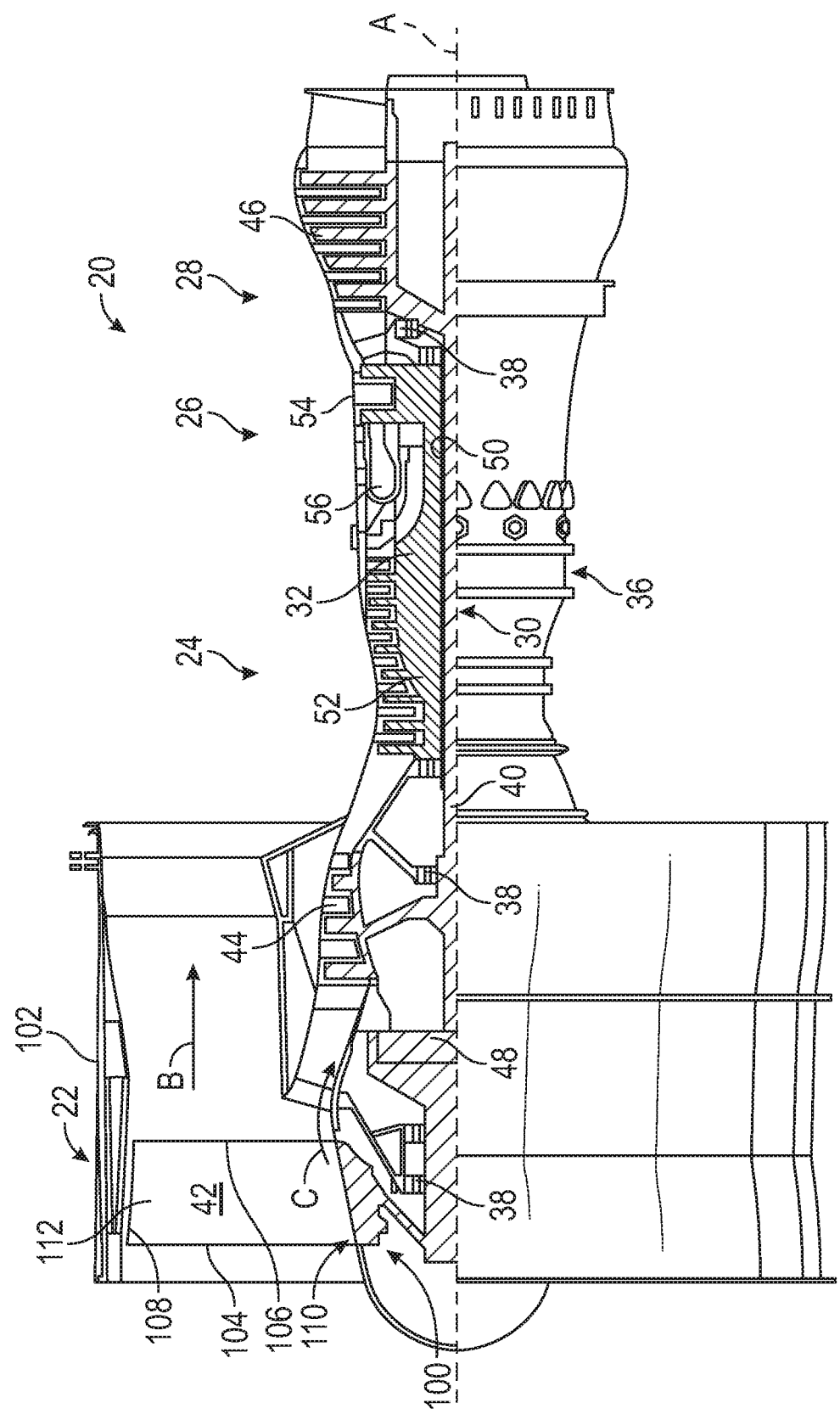
FIG. 1 is a partial cross sectional view of a gas turbine engine according to an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. These sections are alternatively referred to as modules hereinafter. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R]10.5. The "Low corrected fan tip speed" as disclosed herein according to one non-limiting embodiment is less than about 1150 ft/second (350.5 m/sec).

Figure 2:
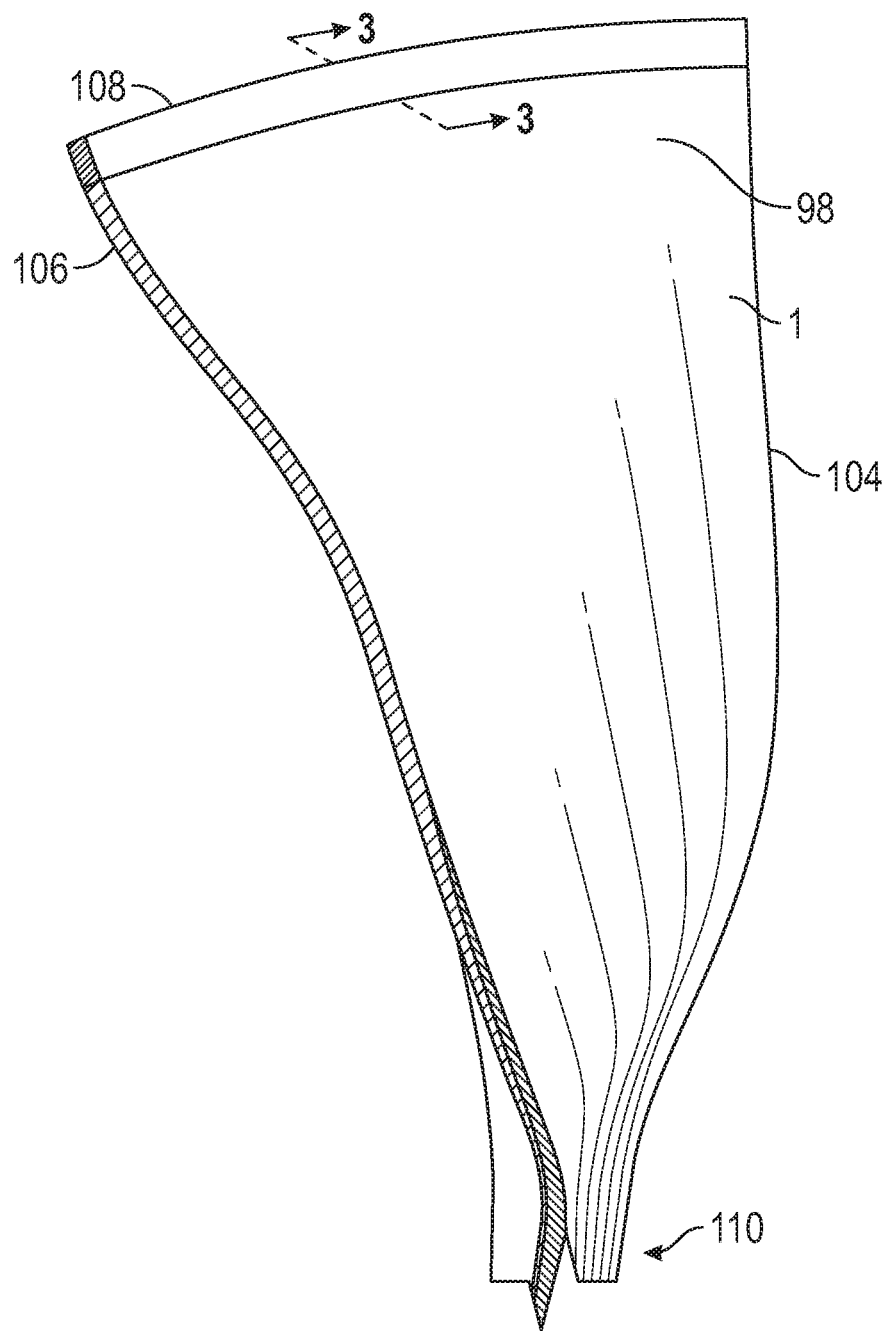
FIG. 2 is a perspective view of a fan blade according to an embodiment of the disclosure.

Turning to the figures the fan section 22 may include a fan 42 with plurality of fans blades including fan blade 98. As illustrated in FIG. 2, the fan blade 98 may have an airfoil with a leading edge 104 and a trailing edge 106 spaced therefrom along a fan chord. The fan blade 98 may have a fan blade tip 108 and a fan blade root 110 spaced therefrom along a fan span. The fan blade tip 108 may be adjacent to the fan case 102 and the fan blade root 110 may be connected to a fan rotor 100. The fan blade 98 may have a pressure side surface 112 and a suction side surface 114.

Figure 3:
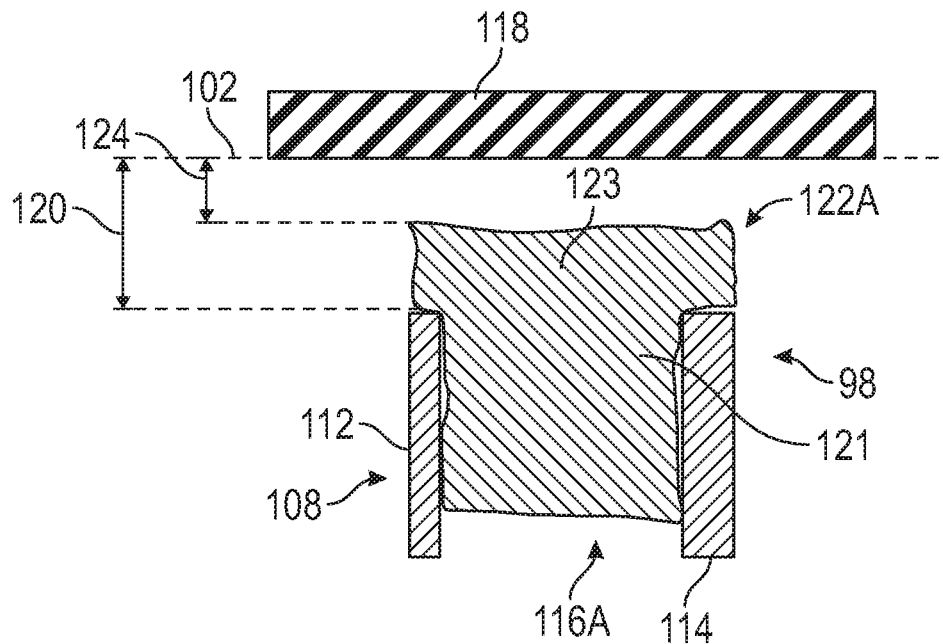
FIG. 3 is a cross sectional view of a fan blade tip according to an embodiment of the disclosure.
Figure 4:
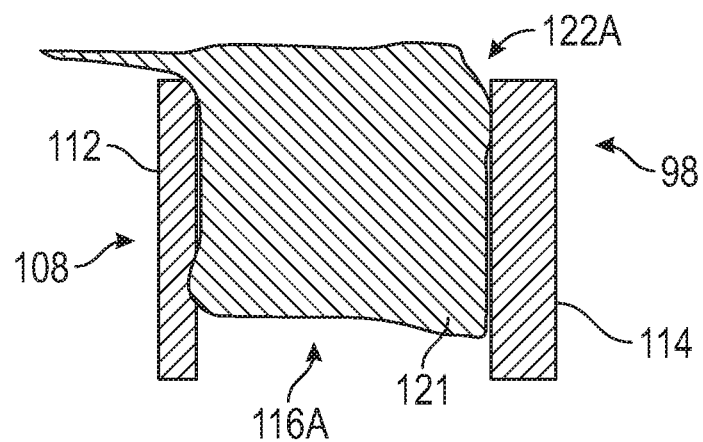
FIG. 4 is a cross sectional view of a fan blade tip according to an embodiment of the disclosure.

As illustrated in FIGS. 3 and 4, a first gap 120 may be between the fan blade tip 108 and the fan case 102. Facing the fan tip 108 on the fan case 102 may be one or more abradable rub strips including a first abradable rub strip 118. As further illustrated in FIGS. 3-5, opposing the rub strips may be a plurality of frangible strips including first and second frangible strips 122A, 122B connected to the fan blade tip 108.

An abradable portion 123 of the frangible strip 122A may extend into the first gap 120 by a distance covering a predicted range of motion for the blade tip 108 following perturbing event. The frangible strip 122A forms a second gap 124 between the abradable portion 123 and the fan case 102. The second gap 124 may besmaller than the first gap 120. The second gap 124 may provide the necessary space between the abradable rub strip 118 of the case and the abradable portion 123 of the frangible strip 122A on the blade 98 during normal unperturbed fan operation.

Figure 5:
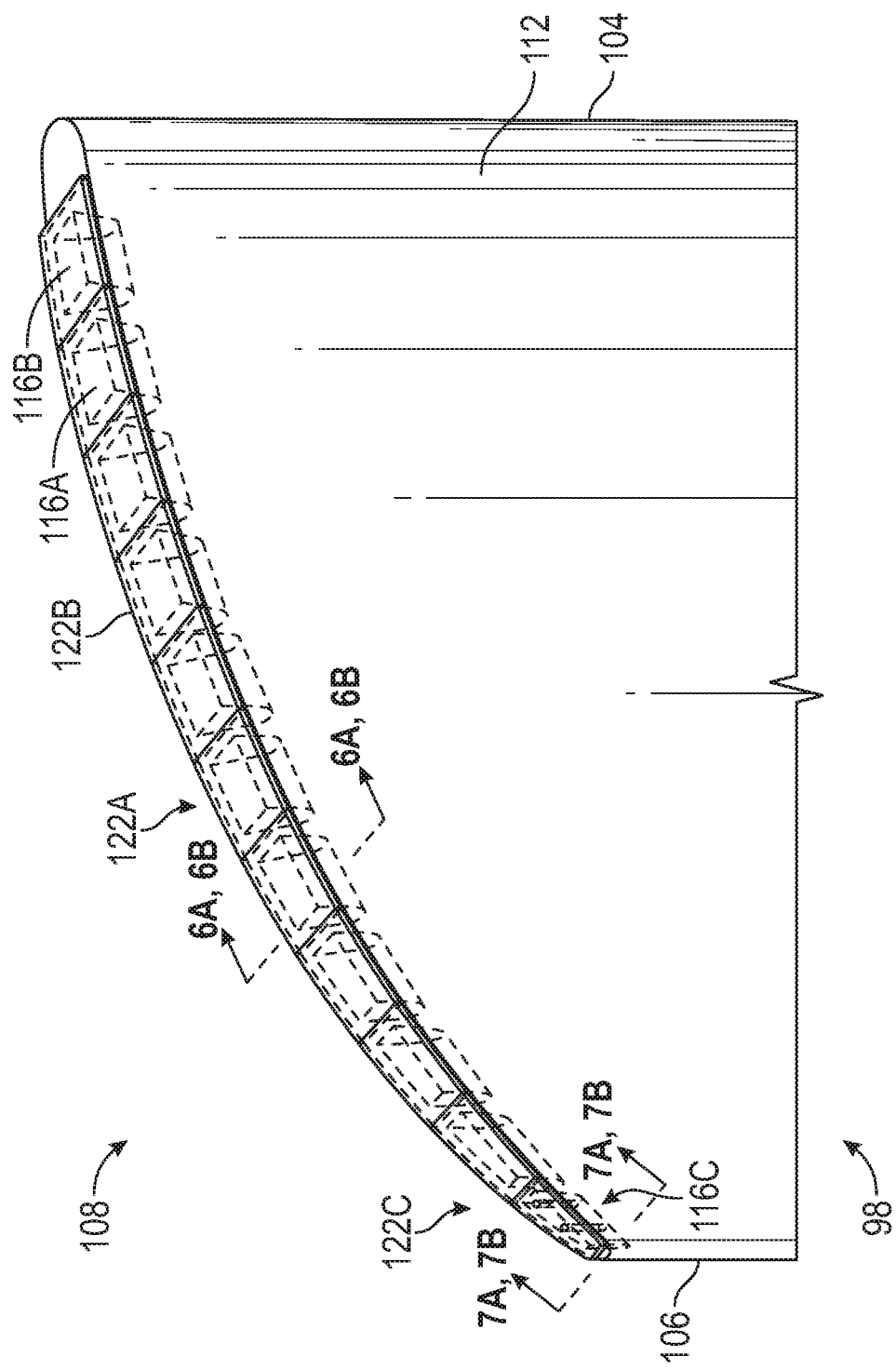
FIG. 5 is a partial view of a fan blade tip according to an embodiment of the disclosure.
Figure 6A:
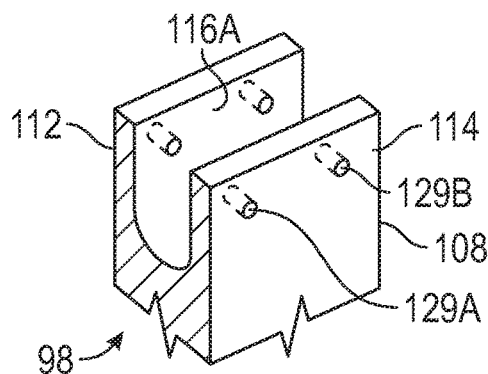
FIGS. 6A and 6B respectively illustrate an insert for a fan blade tip and a fan blade tip according to an embodiment of the disclosure.
Figure 6B:
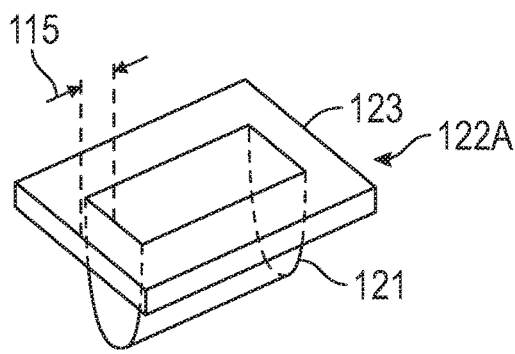

The abradable portion 123 of the frangible strip 122A extends beyond the suction side surface 112 to cover the top edges of the suction side 112 and the pressure side surface 114 of the fan blade tip 108. As illustrated in FIGS. 5, 6A and 6B the abradable portion 123 of the frangible strip 122A also extends in the chord-wise direction 115 to fill chord-wise gaps between adjacent frangible strips in the blade tip 108.

The profile shape of the external portion 123 of the frangible strip 122A provides the blade 98 with a smooth aerodynamic transition between the blade tip 108 and the frangible strip 122.

Turning to FIGS. 3, 5 and 6B, a plurality of blade tip mating surfaces including first and second concave channels 116A, 116B are illustrated facing radially outwardly from bald tip 108. A convex portion 121 of the frangible strip 122A may extend into the first blade channel 116A and forms a mating surface for a secured connection to the blade tip 108. The convex portion 121 of the frangible strip 122A may be fixed to the first blade channel 116A with one or more dowels 125A, 125B illustrated in FIG. 7A. The dowels are inserted through a matching one or more through-holes 127A, 127B in the internal portion 121 of the frangible strip 122A illustrated in FIG. 8A and one or more pairs of opening holes 129A, 129B in the blade tip 108 illustrated in FIG. 6A.

Figure 7A:
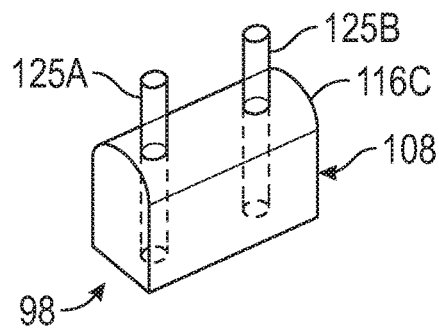
FIGS. 7A and 7B respectively illustrate an attachment for a fan blade tip and a fan blade tip according to an embodiment of the disclosure.
Figure 7B:
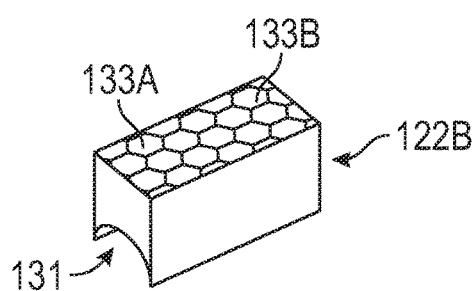

Near the leading and trailing edges 104, 106 of the fan blade tip 108, where material of the blade 98 is thin, the configuration in FIGS. 7A and 7B can be utilized for connecting frangible strip 122C to the fan blade tip 108. A concave channel 131 is formed in the blade tip facing surface of the frangible strip 122B. A complementary convex curvature is formed at the mating surface 116C of the blade tip 108 to receive the channel 131. Dowels 125A, 125B connect the mating surfaces of the frangible strip 122B and the blade tip 108. No internal portion of the frangible strip 122B is utilized in this configuration.

Figure 8A:
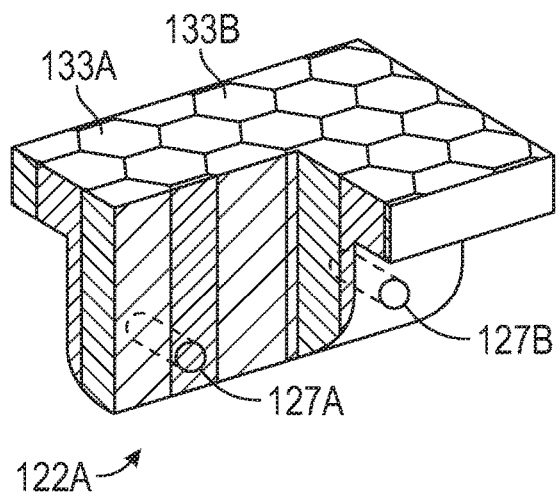
FIGS. 8A and 8B respectively illustrate an attachment for a fan blade tip and a fan blade tip according to an embodiment of the disclosure.
Figure 8B:
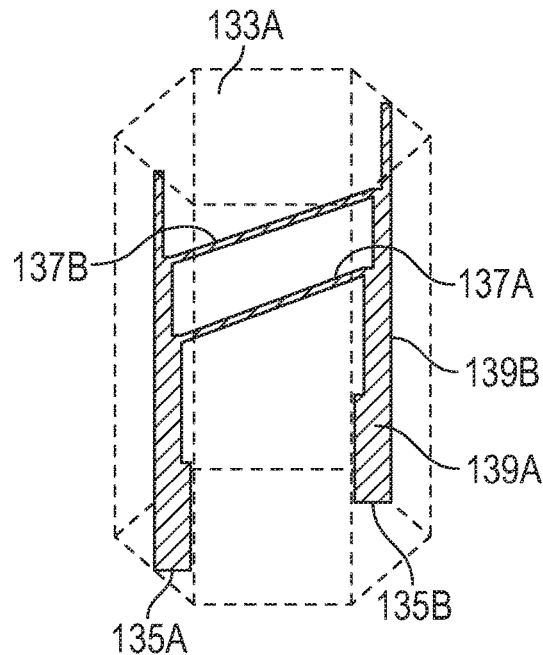

As illustrated in FIGS. 7B, 8A and 8B, the frangible strip 122A may have anisotropic strength characteristics. Using ultrasonic additive manufacturing the internal structure of the frangible strip 122A may comprise a plurality of elongated honeycomb columns or portions including first and second honeycomb portions 133A, 133B, extending in the span-wise direction for the fan blade 98. Moreover honeycomb portion 133A may have internal stiffening tubes including span wise extending tubes 135A, 135B and chordwise extending tubes 137A, 137B. The tubes 135A, 135B may taper in the spanwise direction into different radial sections including first and second radial sections 139A, 139B to provide for desired abradable properties, such as easier wear toward the radial outer tip. This configuration enables the frangible strip 122A to remain structurally connected to the blade tip 108 during a perturbing event. In addition, the frangible strip 122A may be less resistant to plastic deformation than the abradable rub strip 118. As may be desired, the chord-wise tubes may taper for predetermined stress and or strain characteristics.

Such strength characteristics may enable the frangible strip 122A to absorb impact torques via plastic deformations such as wearing away or fracturing. Such result may minimize or prevent the fan blade tip 108 from striking the fan case 102 and sending torque induced stress and strain through the engine static structures. The frangible strip 122A may be more resistant to plastic deformation than the abradable rub strip 118 so that the abradable rub strip wears as intended.

Accordingly the disclosed embodiments are directed to a frangible strip 122A for a fan blade 98 that conforms to design tolerances and exhibits frangibility during perturbing events, reducing torque loading on engine cases and static structures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan blade for a gas turbine engine, the fan blade comprising:
   an airfoil having a leading edge, a trailing edge, a tip, and
   a frangible strip connected to the blade tip and extending outwardly therefrom, the frangible strip being less resistant to plastic deformation than the fan blade tip, wherein,
   the fan blade tip and the frangible strip are connected by an arcuate concave mating portion in the fan blade tip and an arcuate convex mating portion in the frangible strip,
   an abradable portion of the frangible strip extends over a pressure side edge so as to be flush with a pressure side surface of the fan blade tip and a suction side edge so as to be flush with a suction side surface of the fan blade tip, and the frangible strip extends in a fan blade chord direction over the fan blade tip, whereby the first extension of the frangible strip and the suction side surface of the fan blade form a first aerodynamically continuous surface and the second extension of the frangible strip and the pressure side surface form a second aerodynamically continuous surface.

2. The fan blade of claim 1 wherein one or more dowels fix the frangible strip to the fan blade tip.

3. The fan blade of claim 2 wherein the frangible strip is anisotropic and the abradable portion is less resistant to plastic deformation than the mating portion.

4. The fan blade of claim 3 wherein the frangible strip includes a plurality of honeycomb segments that comprise internal stiffening tubes extending and tapering in one or both of a fan blade span direction and the fan blade chord direction.

5. A gas turbine engine comprising
   a fan module including a fan case, a fan rotor, a plurality of fan blades connected to the fan rotor, each fan blade comprising:
   an airfoil having a leading edge, a trailing edge, a tip, and
   a frangible strip connected to the blade tip and extending outwardly therefrom, the frangible strip being less resistant to plastic deformation than the fan blade tip, wherein,
   the fan blade tip and the frangible strip are connected by an arcuate concave mating portion in the fan blade tip and an arcuate convex mating portion in the frangible strip,
   an abradable portion of the frangible strip extends over a pressure side edge so as to be flush with a pressure side surface of the fan blade tip and a suction side edge so as to be flush with a suction side surface of the fan blade tip, and the frangible strip extends in a fan blade chord direction over the fan blade tip, whereby the first extension of the frangible strip and the suction side surface of the fan blade form a first aerodynamically continuous surface and the second extension of the frangible strip and the pressure side surface form a second aerodynamically continuous surface.

6. The engine of claim 5 wherein one or more dowels fix the frangible strip to the fan blade tip.

7. The engine of claim 5 wherein the frangible strip is anisotropic and the abradable portion is less resistant to plastic deformation than the mating portion.

8. The engine of claim 7 wherein the frangible strip includes a plurality of honeycomb segments that comprise internal stiffening tubes extending and tapering in one or both of a fan blade span direction and the fan blade chord direction.

9. The engine of claim 8 including a first gap between the fan blade tip and the fan case and a second gap between the frangible strip and the fan case, the second gap being smaller than the first gap.

10. The engine of claim 9 wherein the fan case includes an abradable rub strip facing the fan blade tip.

11. The engine of claim 10 wherein the frangible strip is less resistant to plastic deformation than the rub strip.

12. A method of minimizing torque transfer to a fan case from a blade of a fan in a gas turbine engine, the fan blade includes:

an airfoil having a leading edge, a trailing edge, a tip, and a frangible strip connected to the blade tip and extending outwardly therefrom, the frangible strip being less resistant to plastic deformation than the fan blade tip, wherein:

the fan blade tip and the frangible strip are connected by an arcuate concave mating portion in the fan blade tip and an arcuate convex mating portion in the frangible strip, an abradable portion of the frangible strip extends over a pressure side edge so as to be flush with a pressure side surface of the tan blade tip and a suction side edge so as to be flush with suction side surface of the fan blade tip, and the frangible strip extends in a fan blade chord direction over the fan blade tip, whereby the first extension of the frangible strip and the suction side surface of the fan blade form a first aerodynamically continuous surface and the second extension of the frangible strip and the pressure side surface form a second aerodynamically continuous surface, and the method comprising contacting a surface of a fan case with the frangible strip located at the blade tip of the airfoil of the fan blade.

13. The method of claim 12 including absorbing at least a portion of torque transferable between the fan blade and the fan case in the frangible strip.

14. The method of claim 13 including plastically deforming the frangible strip to dissipate absorbed torque.

* * * * *